(12) United States Patent
Formato et al.

(10) Patent No.: US 10,831,888 B2
(45) Date of Patent: Nov. 10, 2020

(54) DATA RECOVERY ENHANCEMENT SYSTEM

(71) Applicant: International Business Machines Corporation, Armonk, NY (US)

(72) Inventors: Marci D. Formato, Clintondale, NY (US); Bernhard J. Klingenberg, Grover Beach, CA (US); Andrew S. Kronstadt, Pensacola, FL (US); Kurt A. Rybczyk, Waterbury, CT (US); Lisa A. Shepard, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 15/875,007

(22) Filed: Jan. 19, 2018

(65) Prior Publication Data

US 2019/0228147 A1 Jul. 25, 2019

(51) Int. Cl.
| | | |
|---|---|---|
| *G06F 21/55* | (2013.01) | |
| *G06F 21/56* | (2013.01) | |
| *H04L 29/06* | (2006.01) | |
| *G06F 11/14* | (2006.01) | |
| *G06F 16/178* | (2019.01) | |
| *H04L 9/06* | (2006.01) | |

(52) U.S. Cl.
CPC ........ *G06F 21/554* (2013.01); *G06F 11/1469* (2013.01); *G06F 16/178* (2019.01); *G06F 21/565* (2013.01); *H04L 63/145* (2013.01); *G06F 2201/84* (2013.01); *G06F 2221/034* (2013.01); *H04L 9/0643* (2013.01)

(58) Field of Classification Search
CPC .. G06F 21/554; G06F 16/178; G06F 11/1469; G06F 21/565; G06F 2201/84; G06F 2221/034; H04L 63/145; H04L 9/0643
See application file for complete search history.

(56) References Cited

U.S. PATENT DOCUMENTS

| | | |
|---|---|---|
| 8,220,053 B1 | 7/2012 | Sun et al. |
| 9,317,686 B1 | 4/2016 | Ye et al. |
| 9,471,256 B2 | 10/2016 | Seibert et al. |
| 10,193,918 B1 * | 1/2019 | Patton ................. H04L 63/1491 |
| 2007/0283438 A1 | 12/2007 | Fries et al. |
| 2008/0115145 A1 * | 5/2008 | Codrescu ............ G06F 11/3656 719/312 |
| 2014/0289851 A1 | 9/2014 | Klein et al. |
| 2015/0172304 A1 | 6/2015 | Kleczynski |

(Continued)

OTHER PUBLICATIONS

Clarke, "Practicable Backup Arrangements for Small Organisations and Individuals," Australasian Journal of Information Systems, vol. 20, 2016, pp. 1-25.

(Continued)

*Primary Examiner* — Michael Pyzocha
(74) *Attorney, Agent, or Firm* — Yee & Associates, P.C.

(57) ABSTRACT

A method for detecting ransomware. A set of control files in a set of locations in a file system is checked, by a computer system, in response to an event, wherein the set of control files has a set of extensions targeted by the ransomware. In response to detecting a change in any of the set of control files, a file copying process for the file system is disabled by the computer system.

16 Claims, 5 Drawing Sheets

(56) References Cited

U.S. PATENT DOCUMENTS

| | | | |
|---|---|---|---|
| 2016/0180087 A1* | 6/2016 | Edwards | G06F 21/566 |
| | | | 726/24 |
| 2016/0314048 A1 | 10/2016 | Liu | |
| 2017/0140156 A1* | 5/2017 | Gu | G06F 21/602 |
| 2017/0206353 A1* | 7/2017 | Jai | H04L 67/1097 |
| 2017/0270293 A1* | 9/2017 | Gu | G06F 21/54 |
| 2017/0310705 A1* | 10/2017 | Gopalakrishna | H04L 41/0886 |
| 2017/0324755 A1* | 11/2017 | Dekel | H04L 63/145 |
| 2017/0364681 A1* | 12/2017 | Roguine | G06F 21/554 |
| 2017/0366563 A1* | 12/2017 | Volfman | H04L 63/1491 |
| 2018/0034835 A1* | 2/2018 | Iwanir | H04L 63/1416 |
| 2018/0146009 A1* | 5/2018 | Primm | H04L 63/1491 |
| 2018/0212987 A1* | 7/2018 | Tamir | G06F 21/568 |
| 2018/0248896 A1* | 8/2018 | Challita | H04L 63/1491 |
| 2018/0293379 A1* | 10/2018 | Dahan | G06F 21/566 |
| 2018/0324214 A1* | 11/2018 | Schoenherr | G06F 21/6209 |
| 2019/0028488 A1* | 1/2019 | Woo | G06F 21/6218 |

OTHER PUBLICATIONS

Moore, "Detecting Ransomware with Honeypot techniques," 2016 Cybersecurity and Cyberforensics Conference (CCC), Amman, Jordan, Aug. 2016, pp. 77-81.

* cited by examiner

DATA RECOVERY ENHANCEMENT SYSTEM

BACKGROUND

1. Field

The disclosure relates generally to an improved data processing system and, more specifically, to a method, an apparatus, a system, and a computer program code for enhancing a probability of protecting data through ransomware detection.

2. Description of the Related Art

Malware is malicious software that can include a variety of different types of hostile or intrusive software. Malware typically comprises program code, scripts, active content, or forms of hostile or intrusive software. Malware can be used to obtain information such as passwords, credit card information, social security numbers, or other types of information that are sensitive or confidential to an individual or organization. Malware can include, for example, computer viruses, worms, Trojan horses, ransomware, spyware, adware, and other types of software.

For example, ransomware has become more and more prevalent. Ransomware is a type of malicious software that can publish data or block access to data unless a ransom is paid. For example, ransomware can block access to a computer, a mobile phone, or some other device. In another example, ransomware can employ cryptoviral extortion in which the ransomware encrypts files in the file system. Encryption makes these files inaccessible with a demand being made for payment to decrypt the files.

In an enterprise environment, if a data processing system, such as a workstation, a server computer, or a desktop computer, is infected and the infection is not noticed immediately, infected files can be backed up. The backing up of these infected files increases the difficulty in recovering from a ransomware attack.

SUMMARY

According to one embodiment of the present invention, a method for detecting ransomware is present. A set of control files in a set of locations in a file system is checked, by a computer system, in response to an event, wherein the set of control files has a set of extensions targeted by the ransomware. Responsive to detecting a change in any of the set of control files, a file copying process for the file system is disabled by the computer system.

According to another embodiment of the present invention, a malware protection system comprising a computer system and a file manager running on the computer system is presented. The file manager checks a set of control files in a set of locations in a file system in response to an event. The set of control files has a set of extensions targeted by ransomware. The file manager disables a file copying process for the file system in response to detecting a change in any of the set of control files.

According to yet another embodiment of the present invention, a computer program product for detecting ransomware is presented. The computer program product is comprised of a computer-readable storage media, first program code, and second program code. The first program code and the second program code are stored on the computer-readable storage media. The first program code checks a set of control files in a set of locations in a file system in response to an event, wherein the set of control files has a set of extensions targeted by the ransomware. The second program code disables a file copying process for the file system in response to detecting a change in any of the set of control files.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that it would be desirable to increase the probability that data can be recovered when ransomware attacks a file system. The illustrative embodiments recognize and take into account that a backup can be used to restore files that may have been encrypted by the ransomware. The illustrative embodiments recognize and take into account, however, that when infected files are backed up, these files cannot be recovered utilizing the backup. The illustrative embodiments recognize and take into account that this situation results in the backups no longer containing uninfected files that can be restored. As more and more files are encrypted or, otherwise, altered files are backed up, the difficulty in recovering the files increases.

Thus, the illustrative embodiments provide a method, an apparatus, a system, and a computer program product for detecting ransomware. In one illustrative example, a computer system checks a set of control files in a set of locations in a file system in response to an event. The set of files has a set of extensions targeted by the ransomware. Responsive to detecting a change in any of the set of control files, the computer system disables a file copying process for the file system.

Figure 1:
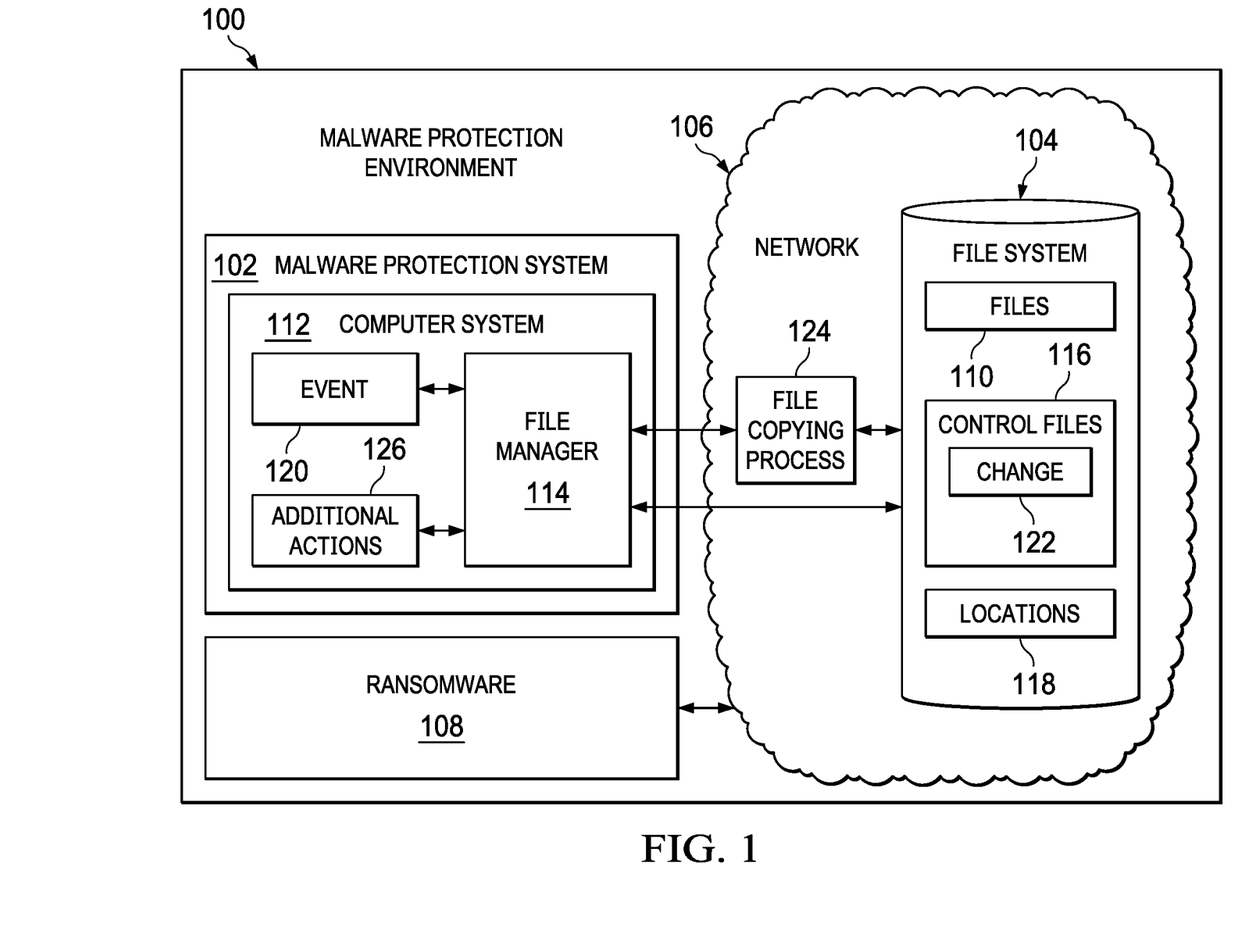
FIG. 1 is a block diagram of an intrusion protection environment in accordance with an illustrative embodiment.

With reference now to the figures and, in particular, with reference to FIG. 1, a block diagram of a malware protection environment is depicted in accordance with an illustrative embodiment. Malware protection environment 100 is an environment in which malware protection system 102 can be employed to protect file system 104. In this illustrative example, file system 104 is a file system selected from a group comprising a disk file system, a compression file system, a virtual file system, a server array, a storage array, a shared disc file system, a network file system, a cloud file system, or some other suitable type of file system.

As depicted, file system 104 is located on network 106. Network 106 may take a number of different forms. For example, network 106 can be comprised of one or more components selected from at least one a local area network (LAN), a wide area network (WAN), an intranet, the Internet, a metropolitan area network (MAN), a cloud-based network, or some other suitable type of network.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, malware protection system 102 can protect file system 104 from attacks by ransomware 108. For example, malware protection system 102 can protect against backing up of files 110 in file system 104 that may have been compromised through an attack by ransomware 108.

As depicted, malware protection system 102 comprises computer system 112 in which file manager 114 is located. Computer system 112 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet computer, a mobile phone, or some other suitable data processing system.

Computer system 112 may be located in network 106, or computer system 112 may be an external component to network 106 on which file system 104 is located in this particular illustrative example. For example, file manager 114 can check a set of control files 116 in a set of locations 118 in file system 104 in response to event 120. As used herein, "a set of," when used with reference to items, means one or more items. For example, "a set of control files 116" is one or more of control files 116.

Control files 116 are honeypots in these illustrative examples. In other words, control files 116 can be used to detect, counteract, isolate, or manage an attack by ransomware 108. In this illustrative example, event 120 can be selected from a group comprising a periodic event and a non-periodic event. The periodic event may be, for example, an expression of a timer. The non-periodic event may be, for example, the detection of a suspicious action in network 106, a modification of a file within files 110, or some other suitable event.

In response to detecting change 122 in any of the set of control files 116, file manager 114 disables file copying process 124 for file system 104. As depicted, file copying process 124 may take a number of forms. For example, file copying process 124 may be selected from a group comprising a backup application, a snapshot process, a replication process, or any other suitable process in which one or more files in files 110 are copied. The copying can be for backup purposes. In another example, the copying can be for archiving purposes for one or more of files 110 for file system 104.

The disabling of file copying process 124 can be performed in a number of different ways. For example, file copying process 124 may be stopped, suspended, or otherwise prevented from copying files 110. As depicted, file copying process 124 can be disabled using a number of different mechanisms. For example, at least one of a configuration file, a command, or some other instruction used to invoke file copying process 124 can be invalidated. The configuration file, command, or other instruction can be altered, redirected, or otherwise modified such that file copying process 124 cannot run or start running. Examples of running processes that can be stopped by file manager 114 include scheduled jobs, scheduled backups, scheduled server replications, snapshot processes, or other running processes.

In addition to disabling file copying process 124, file manager 114 can perform a group of additional actions 126. As used herein, "a group of," when used with reference to items, means one or more items. For example, "a group of additional actions 126" is one or more of additional actions 126. In this particular illustrative example, the group of additional actions 126 is selected from at least one of sending an alert or initiating an intrusion protection process to scan file system 104.

Figure 2:
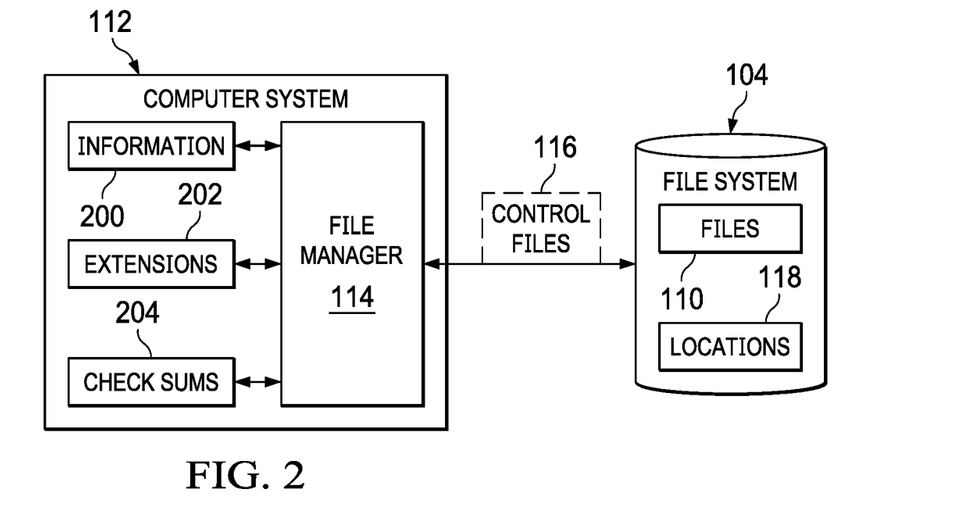
FIG. 2 is a data flow diagram for creating control files in accordance with an illustrative embodiment.

With reference now to FIG. 2, a data flow diagram for creating control files is depicted in accordance with an illustrative embodiment. In the illustrative examples, the same reference numeral may be used in more than one figure. This reuse of a reference numeral in different figures represents the same element in the different figures.

In this illustrative example, file manager 114 creates control files 116. File manager 114 also places a set of control files 116 in a set of locations 118 in file system 104. In creating control files 116, file manager 114 creates information 200 for the set of control files 116. Information 200 may be information that is likely to be examined or targeted by ransomware 108 in FIG. 1 or some other malware. In this illustrative example, information 200 is useless information that cannot be used for leverage or to obtain payment.

Additionally, file manager 114 selects a set of extensions 202 for the set of control files 116. These extensions can be selected as extensions typically attacked by ransomware 108 in FIG. 1. For example, extensions 202 can be selected from at least one of *.doc, *.xls, *.ppt, *.jpg, *.pdf, or some other extension that may be targeted by ransomware 108.

As depicted, the set of locations 118 for the set of control files 116 can be selected in a number of different ways. In one illustrative example, the selection can be based on where ransomware 108 is likely to initially attack files 110. For example, the set of locations 118 can be a root directory or topmost directory for file system 104.

Further, file manager 114 also can create a set of check sums 204 for the set of control files 116. A check sum in the set of check sums 204 is for a corresponding control file in the set of control files 116. In this illustrative example, the set of check sums 204 is created using at least one of a cryptographic check sum algorithm, an MD5 algorithm, an MD6 algorithm, a SHA-1 algorithm, or some other suitable algorithm.

As depicted in this example, the set of check sums 204 is stored in a location outside of file system 104. For example, the set of check sums 204 may be stored in a storage device for computer system 112 that is not accessible by other devices within network 106 in FIG. 1.

Figure 3:
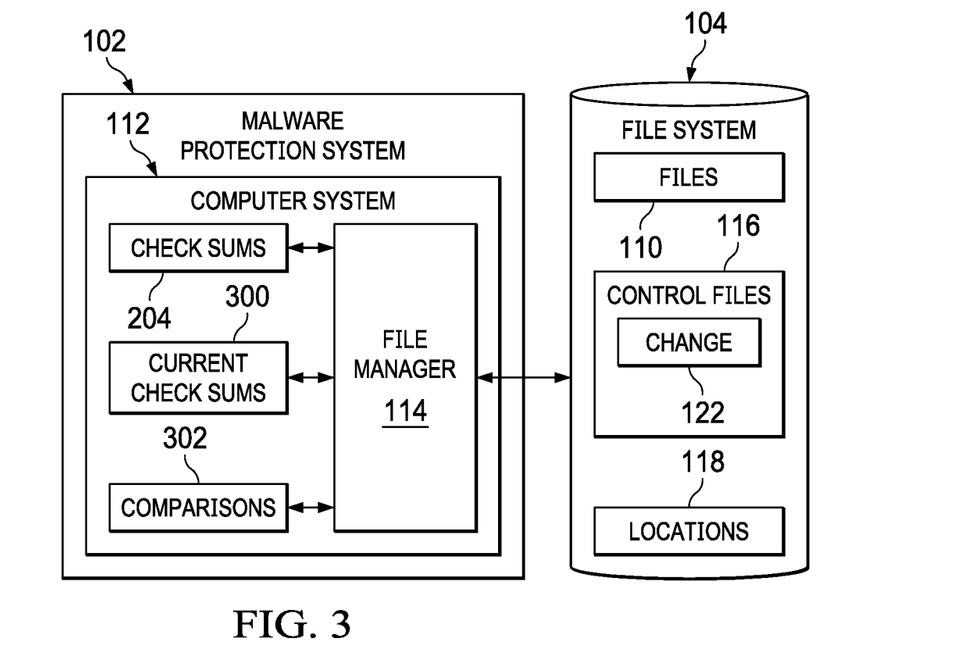
FIG. 3 is a data flow diagram for determining whether a set of control files has been changed by ransomware in accordance with an illustrative embodiment.

With reference now to FIG. 3, a data flow diagram for determining whether a set of control files has been changed by ransomware is depicted in accordance with an illustrative embodiment. In this example, file manager 114 checks a set of control files 116 in a set of locations 118 in file system 104. This check is performed in response to event 120 as described above with respect to FIG. 1.

The determination of whether the set of control files 116 has changed can be performed in a number of different ways. In the illustrative example, file manager 114 identifies a set of check sums 204 for the set of control files 116. File manager 114 creates a set of current check sums 300 for the set of control files 116. More specifically, the set of current check sums 300 is created at the time in which the set of control files 116 is to be checked to determine whether the set of control files 116 has been changed. In this illustrative example, the set of control files 116 is considered to have been changed when one or more of these control files in the set of control files 116 have been changed.

As depicted, file manager 114 compares each of the set of check sums 204 to a corresponding current check sum in the set of current check sums 300 for a control file in the set of control files 116 to form a set of comparisons 302. File manager 114 determines whether change 122 has occurred in any of the set of control files 116 in the set of comparisons 302.

File manager 114 may be implemented in software, hardware, firmware, or a combination thereof. When software is used, the operations performed by file manager 114 may be implemented in program code configured to run on hardware, such as a processor unit. When firmware is used, the operations performed by file manager 114 may be implemented in program code and data and stored in persistent memory to run on a processor unit. When hardware is employed, the hardware may include circuits that operate to perform the operations in file manager 114.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components. For example, the processes may be implemented as circuits in organic semiconductors.

In one illustrative example, one or more technical solutions are present that overcome a technical problem with backups being performed such that the backups contained infected files. As a result, one or more technical solutions may provide a technical effect of stopping or preventing a backup process from backing up infected files from a file system such that the infected files replace uninfected files in the backup. In this manner, one or more technical solutions can reduce the spread of encrypted files in files 110 in file system 104 from reaching backups or other copies of files 110 stored in other locations. In this manner, one or more technical solutions enable increasing the probability that files 110 can be restored in file system 104 when files 110 are attacked by ransomware 108 in FIG. 1.

Thus, the illustrative example disables a file copying process 124 in FIG. 1 to prevent modified files that may be encrypted, infected, damaged, or otherwise modified from reaching a backup server, snapshot, or replication process. In this manner, ransomware 108 may be prevented from potentially replacing good versions of files 110 in file system 104 stored in backups, snapshots, or other storage locations with the modified version. As a result, recovery from attacks on file system 104 by ransomware 108 can be made without necessarily analyzing every individual file to determine whether those files are infected or encrypted. This type of recovery can be made if control files 116 are checked prior to file copying process 124 operating to make a backup, an image, a replication, a snapshot, or a copy of files 110 in file system 104.

As a result, computer system 112 operates as a special purpose computer system in which file manager 114 in computer system 112 enables detecting the presence of attacks by ransomware 108 in FIG. 1 utilizing control files 116 and stopping or preventing file copy process 124 in FIG. 1 from running. In particular, file manager 114 transforms computer system 112 into a special purpose computer system as compared to currently available general computer systems that do not have file manager 114.

The illustration of malware protection environment 100 in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although file manager 114 is illustrated as being located in a separate component from file system 104, file manager 114 can be a part of file system 104 in some illustrative examples. Further, computer system 112 is shown as a separate physical component in communication with network 106. In other illustrative examples, computer system 112 may be one or more computers or other data processing systems located within network 106. In yet another illustrative example, other mechanisms other than check sums may be used to determine whether the set of control files has been changed. For example, a copy of the set of control files can be stored and compared to the set of control files 116 in file system 104.

Figure 4:
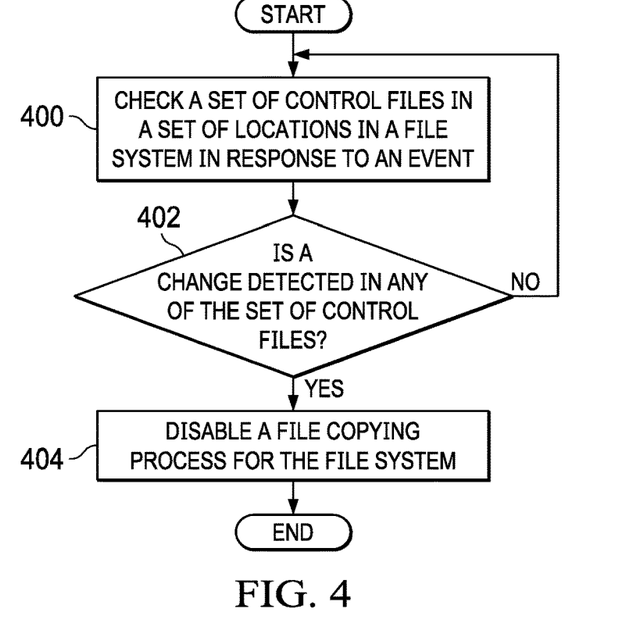
FIG. 4 is a flowchart of a process for detecting ransomware in accordance with an illustrative embodiment.

Turning next to FIG. 4, a flowchart of a process for detecting ransomware is depicted in accordance with an illustrative embodiment. The process illustrated in FIG. 4 can be implemented in hardware, program code, or a combination thereof. When program code is utilized, the program code contains instructions that may be run on a processing unit in a computer system to perform the different steps described in the flowchart.

The process begins by checking a set of control files in a set of locations in a file system in response to an event (step 400). In step 400, the set of files has a set of extensions targeted by ransomware.

A determination is made as to whether a change is detected in any of the set of control files (step 402). If a change is detected, the process disables a file copying process for the file system (step 404). The process terminates thereafter.

With reference again to step 402, if a change is not detected in the set of control files, the process returns to step 400. In this manner, the process enables enhancing the probability that the file system can be restored. By disabling the file copying process, such as a backup process, the number of files that may have been compromised by being encrypted or otherwise damaged may be reduced. As a result, the probability of covering larger amounts or all of the data file system is increased utilizing this type of ransomware detection.

Figure 5:
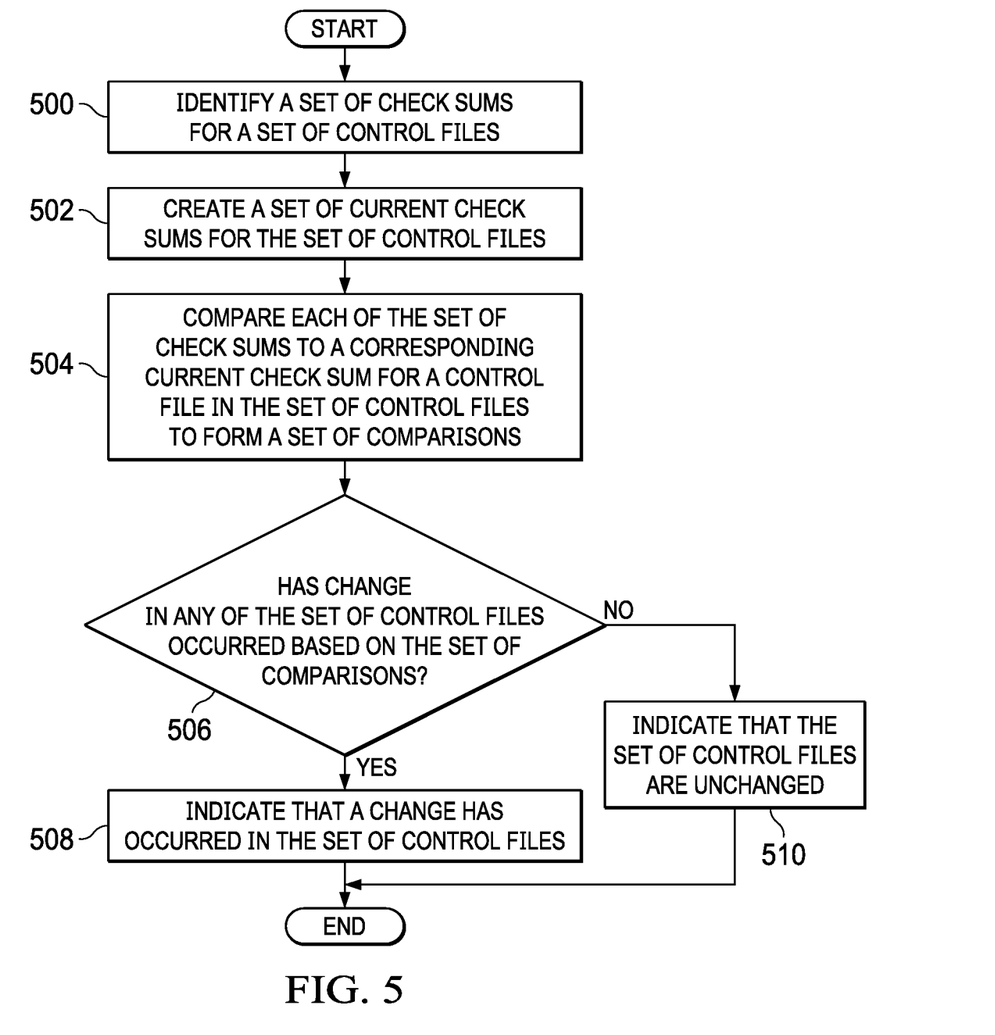
FIG. 5 is a flowchart of process for checking a set of control files in accordance with an illustrative embodiment.

With reference now to FIG. 5, a flowchart of process for checking a set of control files is depicted in accordance with an illustrative embodiment. The process illustrated in this flowchart is an example of one implementation for step 400 in FIG. 1.

The process begins by identifying a set of check sums for a set of control files (step 500). In this illustrative example, the set of check sums are ones created for the set of control files prior to the set of control files being placed in the file system.

The process creates a set of current check sums for the set of control files (step 502). The process compares each of the set of check sums to a corresponding current check sum for a control file in the set of control files to form a set of comparisons (step 504).

A determination is made as to whether change in any of the set of control files has occurred based on the set of comparisons (step 506). If a change has occurred, the process indicates that a change has occurred in the set of control files (step 508). The process terminates thereafter. This change indicates that ransomware has probably accessed the file system and made changes to files in the file system.

With reference again to step 506, if a change has not occurred, the process indicates that the set of control files are unchanged (step 510). The process terminates thereafter.

Figure 6:
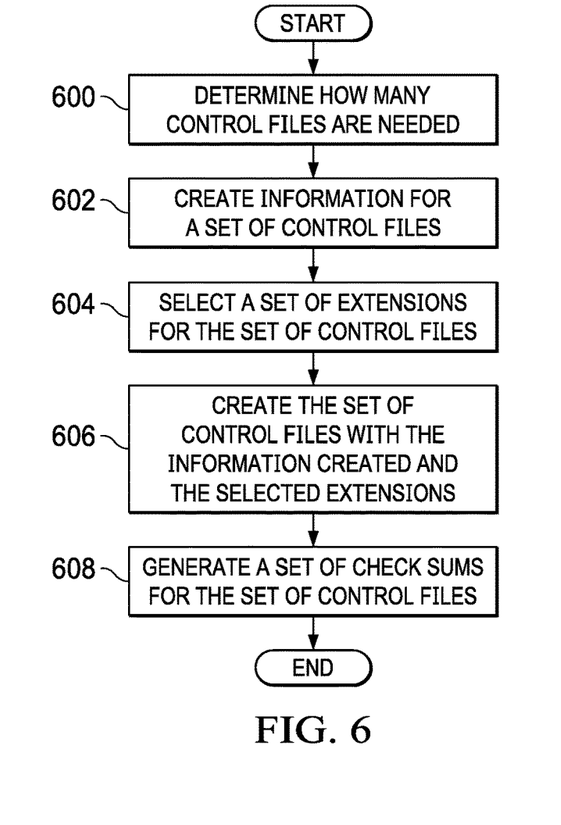
FIG. 6 is a flowchart of process for creating a set of control files in accordance with an illustrative embodiment.

Turning to FIG. 6, a flowchart of process for creating a set of control files is depicted in accordance with an illustrative embodiment. The process illustrated in FIG. 6 can be implemented in hardware, program code, or a combination thereof. When program code is utilized, the program code contains instructions that may be run on a processing unit in a computer system to perform the different steps described in the flowchart.

The process begins by determining how many control files are needed (step 600). The determination may be made a number of different ways. For example, the number of control files may be based on a number of locations in a file system that should be monitored for attacks by ransomware. For example, the locations may be based on locations where ransomware begins attacks on file systems. Further, the locations may be based on placing control files and folders or directories where important data may be located. These and other considerations may be used to identify how many control files are needed.

The process creates information for a set of control files (step 602). In step 602, the information can be information that is likely to be examined or targeted by ransomware or other malware. The process selects a set of extensions for the set of control files (step 604). These extensions are selected as extensions are typically attacked by ransomware 108 in FIG. 1. For example, the extensions can be selected from at least one of *.doc, *.xls, *.ppt, *.jpg, *.pdf, or some other extension that may be targeted by ransomware.

The process creates the set of control files with information created and the selected extensions (step 606). The process then generates a set of check sums for the set of control files (step 608). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
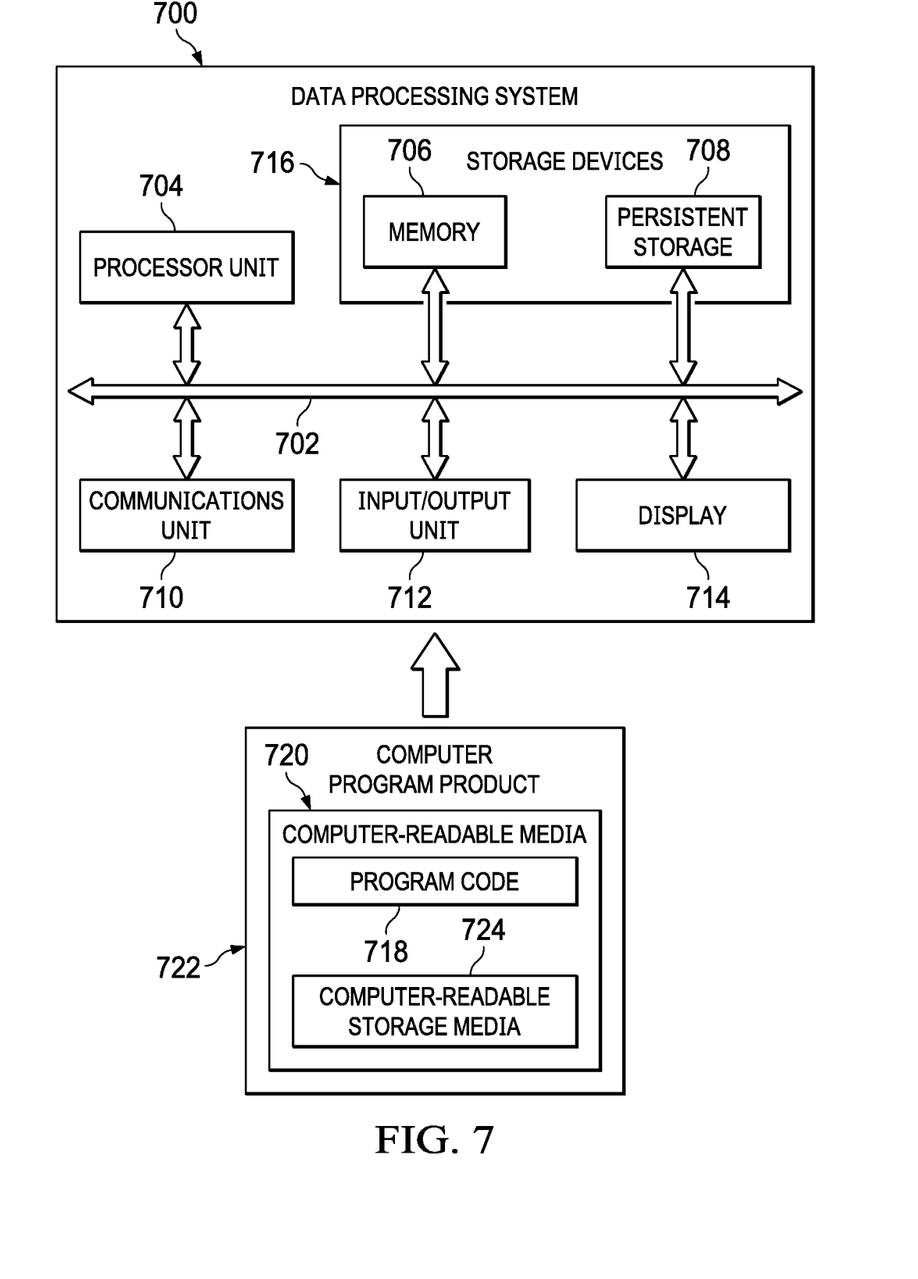
FIG. 7 is a block diagram of a data processing system in accordance with an illustrative embodiment.

Turning now to FIG. 7, a block diagram of a data processing system is depicted in accordance with an illustrative embodiment. Data processing system 700 may be used to implement computer system 112. In this illustrative example, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random-access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724. In these illustrative examples, computer-readable storage media 724 is a physical or tangible storage device used to store program code 718 rather than a medium that propagates or transmits program code 718.

Alternatively, program code 718 may be transferred to data processing system 700 using a computer-readable signal media. The computer-readable signal media may be, for example, a propagated data signal containing program code 718. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Thus, the illustrative embodiments provide a computer implemented method, a computer system, and a computer program product for detecting ransomware. In one illustrative example, the computer system checks a set of control files in a set of locations in a file system in response to an event, wherein the set of files has a set of extensions targeted by the ransomware. The computer system disables a file copying process for the file system in response to detecting a change in any of the set of control files. In this manner, backup processes or other file copying process can be disabled or otherwise prevented from copying files from the file system. In this manner, the backups or other copies of files from the file system may be used to restore the file system in a manner that increases the likelihood that the restoration can restore more data than if the backup process or other file copying process were allowed to run. In the illustrative examples, these control files are honeypots that, when tripped, result in file copying processes such as backup software, snapshot processes, replication processes, or other processes to be stopped and unable to run.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting ransomware comprising:
   creating, by a computer system, a set of control files;
   placing, by the computer system, the set of control files in a set of locations in a remote file system located on a network by sending, by the computer system, the set of control files to the remote file system using the network, wherein the computer system and the remote file system are separate systems that are each coupled to the network;
   creating, by the computer system, a set of check sums for the set of control files, wherein a check sum in the set of check sums is for a corresponding control file in the set of control files;
   storing, by the computer system, the set of check sums for the set of control files in a location outside the remote file system;
   checking, by a file manager running on the computer system, the set of control files in the set of locations in the remote file system in response to an event, wherein the set of control files has a set of extensions targeted by the ransomware; and
   responsive to detecting a change in any of the set of control files, invalidating, by the file manager running on the computer system, an instruction that invokes a file copying process for the remote file system located on the network to disable the file copying process.

2. The method of claim 1, wherein the set of check sums is created using at least one of a cryptographic check algorithm, an MD5 algorithm, an MD6 algorithm, and a SHA-1 algorithm.

3. The method of claim 1, wherein checking the set of control files comprises:

identifying, by the computer system, the set of check sums for the set of control files;

creating, by the computer system, a set of current check sums for the set of control files;

comparing, by the computer system, each of the set of check sums to a corresponding current check sum for a control file in the set of control files to form a set of comparisons; and determining, by the computer system, whether the change in any of the set of control files has occurred based on the set of comparisons.

4. The method of claim 1 further comprising:

performing, by the computer system, a group of additional actions.

5. The method of claim 4, wherein at least one of the group of additional actions is initiating an intrusion protection process to scan the remote file system.

6. The method of claim 1, wherein the file copying process is selected from a group comprising a back application, a snapshot process, and a replication process.

7. The method of claim 1, wherein the event is selected from a group comprising a periodic event and a non-periodic event.

8. The method of claim 1, wherein the remote file system is a a shared disc file system.

9. A malware protection system comprising:

a computer system; and a file manager running on the computer system, wherein the file manager checks a set of control files in a set of locations in a remote file system located on a network in response to an event, wherein the set of control files has a set of extensions targeted by ransomware; and invalidates an instruction that invokes a file copying process for the remote file system located on the network to disable the file copying process in response to detecting a change in any of the set of control files, wherein the file manager creates the set of control files, places the set of control files in the set of locations in the remote file system located on the network by sending the set of control files to the remote file system using the network, creates a set of check sums for the set of control files, and stores the set of check sums for the set of control files in a location outside the remote file system, wherein a check sum in the set of check sums is for a corresponding control file in the set of control files.

10. The malware protection system of claim 9, wherein the set of locations is a root directory of the remote file system.

11. The malware protection system of claim 9, wherein in checking the set of control files, the file manager identifies the set of check sums for the set of control files; creates a set of current check sums for the set of control files; compares each of the set of check sums to a corresponding current check sum for a control file in the set of control files to form a set of comparisons; and determines whether the change in any of the set of control files has occurred based on the set of comparisons.

12. The malware protection system of claim 9, wherein the file manager performs a group of additional actions, wherein at least one of the group of additional actions is initiating an intrusion protection process to scan the remote file system.

13. A computer program product for detecting ransomware, the computer program product comprising:

a computer-readable storage media;

first program code, stored on the computer-readable storage media, for checking a set of control files in a set of locations in a remote file system located on a network in response to an event, wherein the set of control files has a set of extensions targeted by the ransomware;

second program code, stored on the computer-readable storage media, for invalidating an instruction that invokes a file copying process for the remote file system located on the network to disable the file copying process in response to detecting a change in any of the set of control files;

third program code, stored on the computer-readable storage media, for creating the set of control files;

fourth program code, stored on the computer-readable storage media, for placing the set of control files in the set of locations in the remote file system located on the network;

fifth program code, stored on the computer-readable storage media, for creating a set of check sums for the set of control files and storing the set of check sums for the set of control files in a location outside the remote file system, wherein a check sum in the set of check sums is for a corresponding control file in the set of control files; and sixth program code, stored on the computer-readable storage media, for sending the set of control files to the remote file system using the network.

14. The computer program product of claim 13 wherein the set of locations is a root directory of the remote file system.

15. The computer program product of claim 13, wherein the second program code comprises:

program code, stored on the computer-readable storage media, for identifying the set of check sums for the set of control files;

program code, stored on the computer-readable storage media, for creating a set of current check sums for the set of control files;

program code, stored on the computer-readable storage media, for comparing each of the set of check sums to a corresponding current check sum for a control file in the set of control files to form a set of comparisons; and program code, stored on the computer-readable storage media, for determining whether the change in any of the set of control files has occurred based on the set of comparisons.

16. The computer program product of claim 13 further comprising:

seventh program code, stored on the computer-readable storage media, for performing a group of additional actions, wherein at least one of the group of additional actions is initiating an intrusion protection process to scan the remote file system.

* * * * *